J. BECKER.
TOOL HOLDING DEVICE.
APPLICATION FILED DEC. 7, 1909. RENEWED OCT. 5, 1911.
1,062,630.  Patented May 27, 1913.
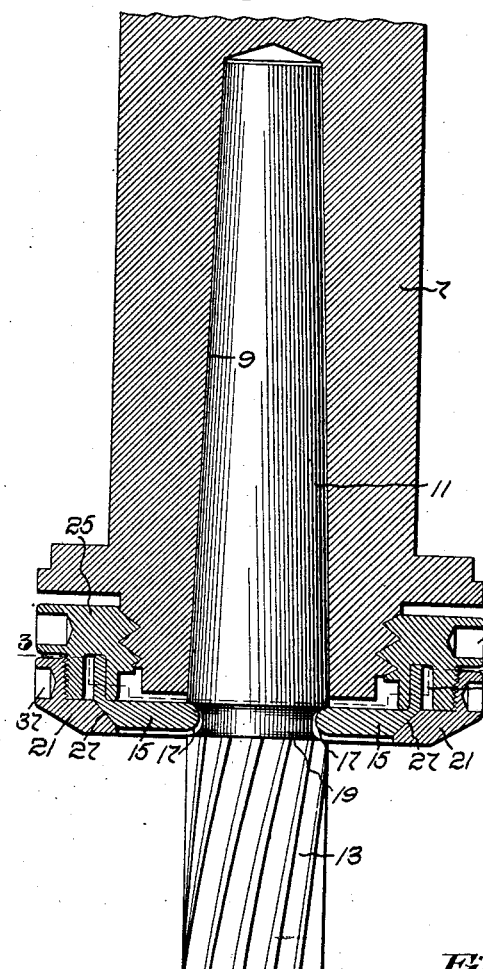
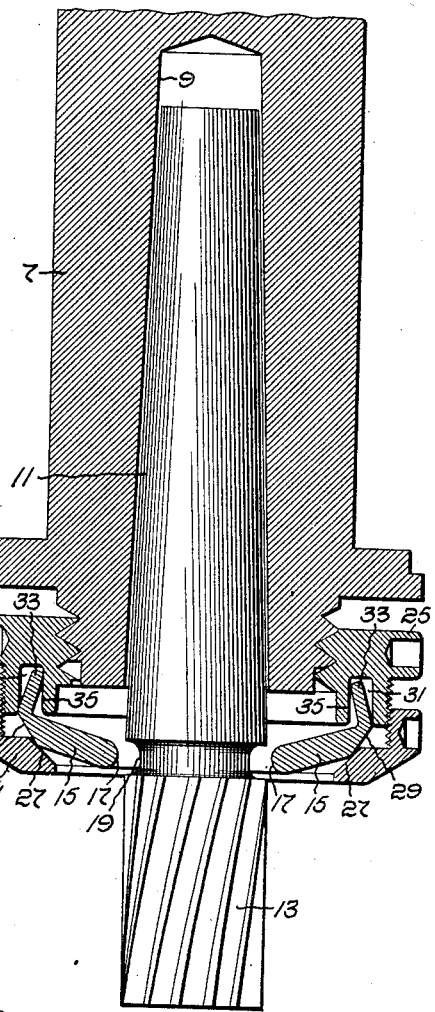
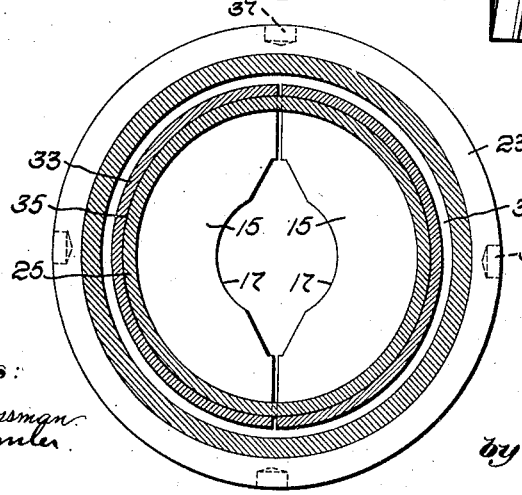
Witnesses:
Horace A. Crossman
Robert H. Hammler
Inventor:
John Becker.
by Emery & Booth
Attys
COLUMBIA PLANOGRAPH CO., WASHINGTON, D. C.

UNITED STATES PATENT OFFICE.

JOHN BECKER, OF HYDE PARK, MASSACHUSETTS.

TOOL-HOLDING DEVICE.

1,062,630.  Specification of Letters Patent.  Patented May 27, 1913.

Application filed December 7, 1909, Serial No. 531,780. Renewed October 5, 1911. Serial No. 653,059.

*To all whom it may concern:*

Be it known that I, JOHN BECKER, a citizen of the United States, and a resident of Hyde Park, in the county of Norfolk and State of Massachusetts, have invented an Improvement in Tool-Holding Devices, of which the following description, in connection with the accompanying drawings, is a specification, like letters on the drawings representing like parts.

This invention relates to tool holding devices and more particularly to a construction whereby a tool may be readily drawn into and secured in the usual spindle and readily removed therefrom.

The character of the invention may be best understood by reference to the following description of an illustrative embodiment thereof shown in the accompanying drawings, wherein:

Figure 1 is a vertical section of a tool holding device embodying my invention; Fig. 2 is a view similar to Fig. 1 showing the parts differently positioned; and Fig. 3 is a horizontal section taken on the irregular line 3—3 of Fig. 1.

Referring to the drawings, 7 typifies a tool receiving device herein in the form of a usual spindle such as is used in milling, drilling and other machines, said spindle being provided with the usual tapered bore 9 for receiving the tapered shank 11 of a milling cutter or other tool 13. Heretofore a variety of devices have been used for securing the tool in the spindle, and among others a draw-bar has been used, which is introduced into the spindle through the upper end thereof and is provided with a threaded end adapted to be screwed into a threaded bore in the end of the tool shank to draw said shank tightly into the spindle. This, however, has been found to be a disadvantageous construction since the threaded portion of said bar is necessarily of small diameter causing its threads to become worn and ineffective, and by said bar the tool cannot be readily removed from the spindle, it being usually necessary to remove said bar from said spindle and drive said shank therefrom. Furthermore, said bar is undesirable since in tall machines the top of the spindle is out of convenient reach of the operative. I aim to overcome the objections to the draw-bar and other constructions by my invention which I will now describe.

This device comprises opposed crescent or segmental shaped jaws 15 which may be curved at their inner edges 17 to form an opening through which the tool 13 referred to may be introduced. These jaws are adapted to be moved into a recess or peripheral groove 19 in said tool, such, for example, as the usual groove occurring between the cutting portions and shank of the tool and are carried by a flange 21 of a ring 23 the latter being threaded on a draw nut or collar 25, threaded, in turn, on the nose of the spindle referred to. After the tool shank has been introduced between said jaws and initially positioned loosely in the taper bore of said spindle (Fig. 2) said jaws are caused to approach and are locked into the tool groove 19. To this end the ring supporting flange 21, referred to, is provided at its upper face with a beveled or cam edge 27 adapted to engage correspondingly beveled or cam peripheries 29 on the under sides of said jaws. It will be apparent that as said jaw supporting ring 23 is screwed onto said ring carrying nut 25 the jaws 15 will be raised and by the action of their beveled peripheries upon the bevel surface of the supporting and lifting ring flange 21 said jaws also will be carried toward one another and enter the peripheral groove 19 in said tool and be securely locked or clamped between said supporting ring 23 and said ring carrying nut 25. To prevent interference with the natural centering of the tapered shank of said tool into the taper bore of said spindle, said jaws preferably should not pinch the tool between them, but should merely enter the groove 19 without engaging the bottom of the latter. To limit the inner movement of said jaws and contribute to the positioning of the same, the nut 25 is provided with an annular guiding groove 31 adapted loosely to receive flanges 33 (Fig. 2) projecting upwardly from the peripheries of said jaws. As the jaws are carried toward one another, as by screwing the jaw supporting ring onto the ring carrying nut, said jaw flanges will bear against and be limited by the inner wall 35 of said groove 31 thereby preventing the edges of said jaws from engaging the bottom of the groove 19 (see Fig. 1) in said tool. The jaws having been locked into said tool groove as described the nut 25 is then screwed onto said spindle, thereby bodily moving said jaws up into engagement with the upper side of the groove 19 (Fig. 1), the continued movement of said jaws drawing the tapered shank of said tool, which was initially positioned as shown in Fig. 2, up into the taper bore of said spindle as shown in Fig. 1, as tightly as desired. As the nut 25 is turned or screwed onto the spindle, the jaws 15 carried therewith will be free to slide around in the peripheral groove 19 in said tool without imparting a turning movement to said tool. As a result the tool shank may be thrust axially in a straight line into the bore of said spindle without turning and without injury to the surfaces of said shank and bore. To remove the tool from the spindle it is merely necessary to turn said nut in the opposite direction thereby carrying said jaw supporting ring and its jaws 15 toward the end of said spindle and into engagement with the lower side of the tool groove 19, the continued movement of said nut drawing the shank out of the taper bore in said spindle. The ring 23 may be then unscrewed from said nut to release said jaws and permit the latter to drop again into the position shown in Fig. 2 thereby permitting the tool to be withdrawn therefrom. To facilitate the entrance and removal of said tool between said jaws the latter may be rounded at their inner edges as desired.
Said nut and ring may be turned in any suitable manner. Herein their peripheries are provided with spaced holes 37 adapted to receive a suitable spanner wrench.

My invention provides a device by which the tool may be positively forced into the taper bore without in any way interfering with the accurate centering of the taper tool shank in the taper bore of the spindle. The large threads which unite the ring carrying nut to the nose of the spindle present a connection of great strength and durability, permitting said tool shank to be forced into said spindle bore as tightly as desired. The tool even though forced with extreme tightness into said spindle may be readily and quickly removed by simply unscrewing the ring carrying nut toward the end of the spindle whereupon the tool may be released from the jaws clamped between said nut and ring by unscrewing the latter from said nut. It will be apparent that by my device no wedge keys, bars or other objectionable devices to be pounded or driven, with accompanying rack and injury to the parts, are necessary to remove the tool shank out of the taper bore of the spindle as have hitherto been necessary. Furthermore, the device is always conveniently accessible for inserting and removing tools as desired.

Having described one embodiment of my invention without limiting myself thereto, what I claim as new and desire to secure by Letters Patent is:

1. A device of the class described comprising, in combination, tool receiving means having a bore therein, a tool having a shank adapted to be introduced into said bore, a shoulder on said tool extending transversely to the axis thereof a nut on said tool receiving means, a ring threaded on said nut and tool engaging means adapted to be moved into engagement with said tool shoulder by relative movement of said nut and ring.

2. A device of the class described comprising, in combination, tool receiving means; a tool having a portion adapted to be introduced therein; and means for setting said tool in said tool receiving means, comprising tool engaging means and two-part means relatively adjustable to move said tool engaging means into engagement with the tool and adjustable as a whole relatively to said tool receiving means for setting the tool therein.

3. A device of the class described comprising, in combination, tool receiving means, a tool having a shank adapted to be introduced into said means, tool engaging means, positioning means to move the latter into a position positively to engage said tool and means to move said positioning means axially of said tool receiving means to force said tool shank therein.

4. A device of the class described comprising, in combination, tool receiving means; a tool having a shank adapted to be introduced into said means; jaws; cam means for forcing said jaws toward said tool; and means to move said cam means axially of said tool receiving means to force said shank therein.

5. A device of the class described comprising, in combination, tool receiving means having a tapered bore therein; a tool having a tapered shank for insertion into said bore; jaws; means to adjust said jaws into a recess in said tool; and means to adjust said jaws, means and tool bodily to thrust the tool shank into said tool receiving means, said jaws having portions guided by said thrusting means.

6. A device of the class described comprising, in combination, tool receiving means, a tool having a shank adapted to be introduced into said means, a collar threaded onto said tool receiving means, jaws guided by said collar and a cam ring threaded onto said collar for moving said jaws into a recess in said tool.

7. A device of the class described comprising, in combination, tool receiving means, a tool having a shank adapted to be introduced into said means, a nut on said tool receiving means, a groove in said nut, jaws having portions loosely occupying said groove and means to force said portions against a wall of said groove to limit the movement of said jaws and cause the latter to enter a recess in said tool.

8. A device of the class described comprising, in combination, tool receiving means having a tapered bore therein, a tool having a tapered shank adapted to be introduced into said means, a collar threaded onto said tool receiving means, jaws guided in a groove in said collar, and a ring threaded to said collar and having a beveled edge for engaging said jaws to move the latter into a peripheral groove in said tool.

9. A device of the class described comprising, in combination, a tool receiving means having a tapered bore therein, a tool having a tapered shank adapted to be introduced into said means, a collar threaded on said tool receiving means, a ring threaded on said collar and opposed jaws received by said ring, said jaws and ring having coöperating cam surfaces whereby said jaws are moved into a position to engage said tool by relative movement between said collar and ring.

10. A device of the class described comprising, in combination, tool receiving means having a tapered bore therein, a tool having a tapered shank adapted to be introduced into said means, a collar 25 threaded on said tool receiving means, a ring 23 threaded on said collar and tool engaging jaws 15 coöperating with said ring.

11. A device of the class described comprising, in combination, tool receiving means; a tool having a taper shank for insertion in said means; tool engaging means for entrance into a circumferential groove in said tool; means to adjust said tool engaging means into said groove; means to thrust said adjusting means longitudinally of said tool receiving means; and means to limit the entrance of said tool engaging means into said groove whereby to prevent said tool engaging means from gripping said tool and imparting rotative movement thereto as said tool is tightened in said tool receiving means.

12. A device of the class described comprising, in combination, tool receiving means having a bore therein; a tool having a portion formed for insertion into said bore; tool-engaging means, and rotative means for adjusting said tool-engaging means toward said tool and axially of said tool receiving means, said rotative means and tool-engaging means being formed to limit the movement of said tool-engaging means toward said tool to provide a loose engagement of said tool-engaging means with said tool, permitting the latter to be thrust axially but not rotatively.

13. A device of the class described comprising, in combination, tool receiving means having a bore therein; a tool having a portion formed for insertion into said bore; tool engaging means; actuating means to move the latter into engagement with said tool; and operating means for said actuating means to move the latter toward or from said tool receiving means, said tool engaging means and operating means having provision for preventing said tool engaging means from gripping said tool to permit the self-centering of the latter in said tool receiving means.

14. A device of the class described comprising, in combination, tool receiving means; a tool having a portion for insertion therein; tool engaging means adapted to open to permit the introduction of said tool into said tool receiving means; actuating means to close said tool engaging means; and means to move said actuating means to draw the end of said tool into said tool receiving means.

15. A device of the class described comprising, in combination, tool receiving means; a tool formed for insertion therein; separable jaws; a ring for closing the latter into positions to engage said tool; and a collar coöperating with said tool receiving means for moving said ring, jaws and tool to set the latter into said tool receiving means.

16. A device of the class described comprising, in combination, tool receiving means; a tool formed for insertion therein; tool engaging means; actuating means to move the latter into engagement with said tool; and means to move said actuating means toward or from said tool receiving means to insert said tool into or remove said tool from said tool receiving means.

17. A device of the class described comprising, in combination, tool receiving means; a tool formed for insertion therein; tool engaging means curved to enter a peripheral groove in the tool; means to adjust said tool engaging means into said groove; and means to adjust said tool engaging means axially of said tool receiving means in opposite directions to introduce said tool into said tool receiving means or remove said tool from said tool receiving means.

18. A device of the class described comprising, in combination, tool receiving means; tool engaging means external thereof and adjustable while on said tool receiving means into positive engagement with the tool; and means for moving said tool engaging means while positively engaging the tool to introduce the latter to or free the same from said tool-receiving means.

19. A device of the class described comprising, in combination, tool receiving means; actuating means; and engaging means adjustable relatively to said actuating means into and out of positive engagement with a tool, said actuating means having provision for adjusting said engaging means to secure the tool to or free the same from said tool receiving means.

20. A device of the class described comprising, in combination, tool receiving means having a taper bore therein; actuating means; and engaging means adjustable relatively to said actuating means into and out of engagement with a tool, said actuating means having provision for moving said engaging means in opposite directions to force the tool into or release the same from said bore.

21. A device of the class described comprising, in combination, tool receiving means; actuating means; engaging means adjustable relatively to said actuating means into and out of positive engagement with a tool; and means to lock said engaging means to said actuating means, the latter being adjustable to move said engaging means and the tool engaged thereby to secure the latter to or free the same from said tool receiving means.

In testimony whereof, I have signed my name to this specification, in the presence of two subscribing witnesses.

JOHN BECKER.

Witnesses:
 HENRY T. WILLIAMS,
 EVERETT S. EMERY.

Copies of this patent may be obtained for five cents each, by addressing the "Commissioner of Patents, Washington, D. C."